Figure 1:
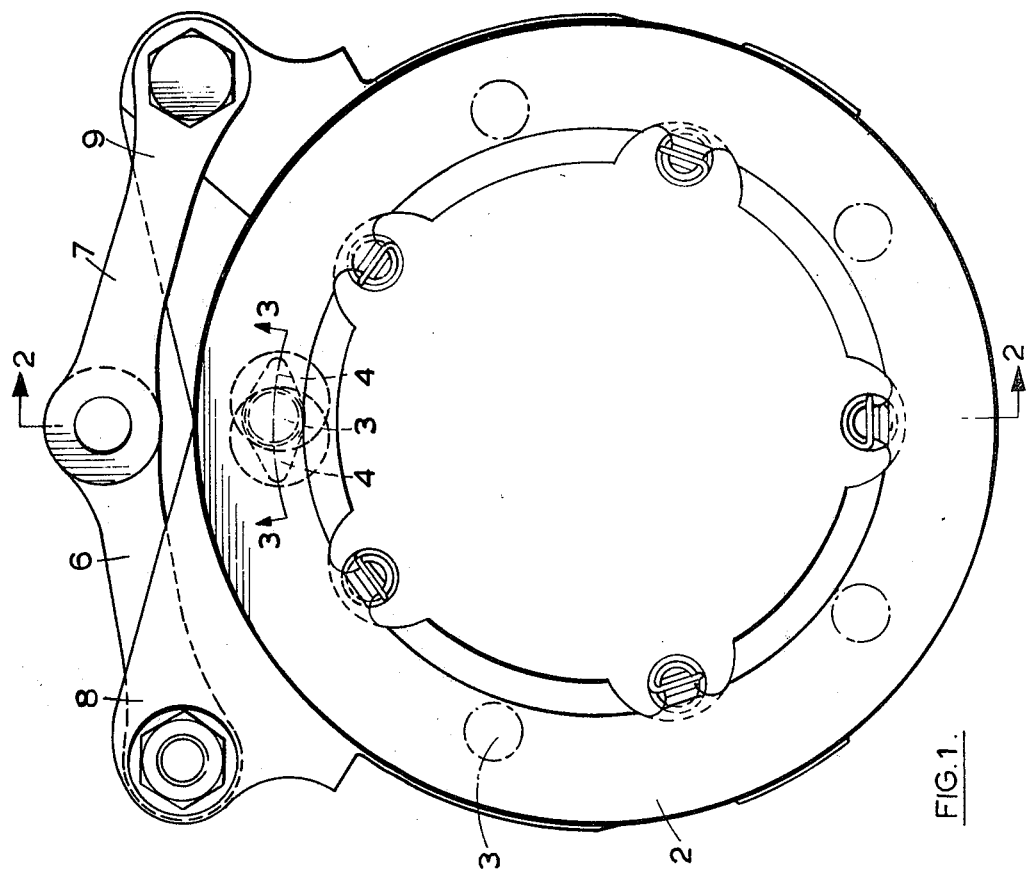

United States Patent [19]
Campbell et al.

[11] 3,952,843
[45] Apr. 27, 1976

[54] SPREADING DISC BRAKE AND CAM ACTUATOR THEREFOR

[75] Inventors: Roy Campbell, Lickey Rock, Nr. Bromsgrove; Anthony George Price, Birmingham, both of England

[73] Assignee: Girling Limited, Birmingham, England

[22] Filed: Aug. 22, 1974

[21] Appl. No.: 499,795

[30] Foreign Application Priority Data
Aug. 23, 1973 United Kingdom............. 39951/73
Nov. 2, 1973 United Kingdom............. 51086/73

[52] U.S. Cl............................. 188/71.4; 74/99 A; 188/72.7; 192/70; 192/70.23; 192/93 A
[51] Int. Cl.²....................................... F16D 55/16
[58] Field of Search............. 188/71.4, 72.2, 72.7, 188/218 XL, 73.2; 192/70, 70.23, 93 A; 74/99 A

[56] References Cited
UNITED STATES PATENTS

| 2,185,435 | 1/1940 | Goepfrich | 188/72.2 |
| 2,230,520 | 2/1941 | Wemp | 188/72.2 X |
| 2,245,988 | 6/1941 | Lambert | 188/72.2 |
| 2,921,651 | 1/1960 | Myers | 188/72.7 X |
| 3,101,813 | 8/1963 | Parrett | 188/71.4 |

*Primary Examiner*—George E. A. Halvosa
*Attorney, Agent, or Firm*—Scrivener Parker Scrivener and Clarke

[57] ABSTRACT

In a spreading disc brake recesses for co-operation with balls located between pressure plates comprise straight grooves of progressively varying depth in inserts mounted in the pressure plates for angular movement about axes normal to the planes of the plates.

11 Claims, 9 Drawing Figures

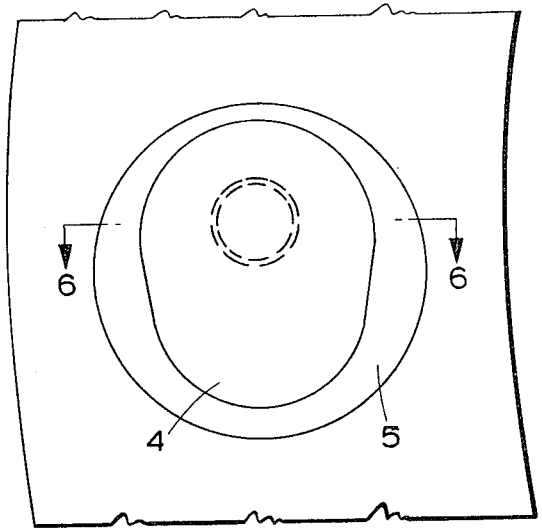
FIG.5.
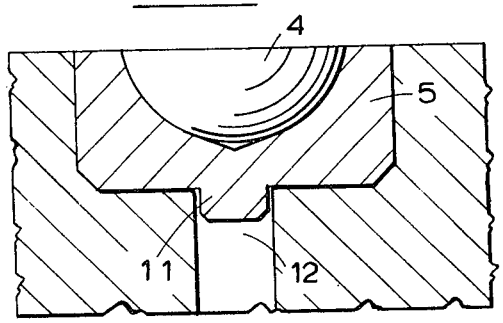
FIG.6.
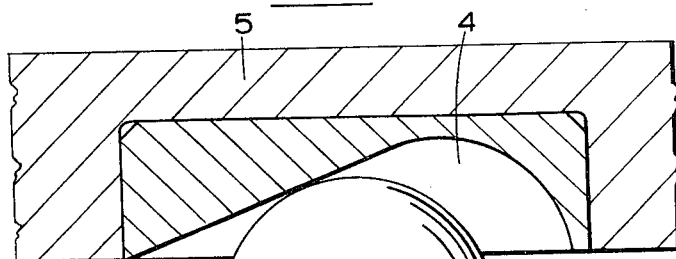
FIG.7.
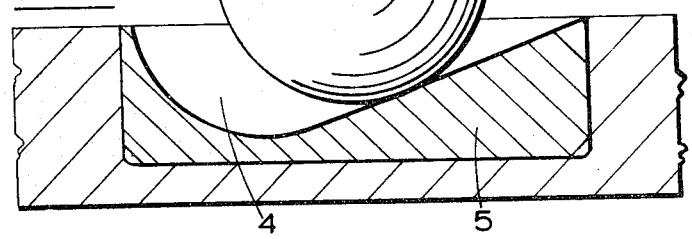

SPREADING DISC BRAKE AND CAM ACTUATOR THEREFOR

This invention relates to improvements in disc brakes of the kind known as spreading disc brakes in which rotatable discs keyed to but axially movable on a shaft are gripped between axially separable pressure plates and radial surfaces in a stationary housing. Angularly spaced balls are located in co-operating oppositely inclined recesses in the adjacent faces of the pressure plates to urge them apart on relative angular movement between the plates. The application of the brake is initiated by moving the pressure plates angularly in opposite directions until they engage the discs. The plates then tend to be carried round with the discs until an abutment on one or other of the plates, according to the direction of rotation of the discs, engages a stop abutment on the housing, and the continued angular movement of the other plate with the discs causes the plates to be urged apart by the balls to apply the brake with a self-energising or servo-action.

A brake as described above is herein referred to as "a brake of the kind set forth".

This invention relates more particularly to inserts for the pressure plates of a brake of the kind set forth, the inserts being provided with the recessed surfaces which co-operate with the balls.

With large diameter brakes of the kind set forth there are few machines available which are capable of accommodating the large diameter pressure plates to machine the recesses for the balls. It is therefore known to provide cylindrical inserts each provided on one end face with a conical recess for a ball, the insert being fixed in a corresponding hole in a face of a pressure plate. Each insert can be separately machined on a machine of small size, and the inserts are then assembled into the pressure plate.

When one of the pressure plates is rotated through a small angle relative to the other during the application of the brake it is important to ensure that each ball rolls circumferentially with respect to the axis of the pressure plates and that the surfaces of the co-operating recesses on which it rolls are inclined at a constant angle with respect to the plane of a plate. As the friction linings wear the servo plate must rotate by a progressively increasing amount before the pressure plates have moved sufficiently far apart to compensate for the reduction in lining thickness and to grip the rotating discs. Thus as the linings wear the balls move over new parts of the recesses and so it is again essential that the slope of the recess remains substantially constant in a circumferential direction for the selfservo characteristics of the brake, which depend on that slope angle, to remain constant as the linings wear.

The balls must be able to roll circumferentially in this way to prevent their jamming and to maintain parallelism of the pressure plates.

A conical recess has the property that a ball rolling up the inclined surface of the recess yet circumferentially about the brake axis travels on a surface of substantially constant inclination with respect to the plane of the plate. An insert with a central conical recess does not have to be oriented in the hole in the pressure plate since it is symmetrical. Inserts with central conical recesses have therefore been used hitherto in brakes of large diameter.

The slope angle of the recess determines the self-servo characteristics of the brake. In a brake of a given size and with linings having given frictional properties there is a minimum slope angle relative to the plane face of the insert below which the brake will lock itself.

According to our invention an insert for a pressure plate in a brake of the kind set forth incorporates a straight groove of progressively varying depth for co-operation with a ball, and the insert is mounted in a recess in the pressure plate for angular movement about an axis normal to the plane of the plate, whereby the ball as it travels along the inclined surface of the groove is caused to move in a path which is circumferential with respect to the axis of the plate.

The form of the groove is such that when the ball lies in the deeper end of the groove the centre of the ball is displaced from the central axis of the insert in the opposite direction from the direction in which the groove becomes shallower. With a conical recess the ball when in the deepest part of the recess is centred with respect to the insert and so the amplitude of permissible movement of the ball can at most be only half the diameter of the insert. By arranging the straight groove in the preferred manner the amplitude of movement of the ball which can be accommodated by an insert of a given diameter may be considerably increased. Thus the use of a groove makes it possible to use inserts of the usual size but which accommodate an increased movement of the balls.

It is essential in assembling a brake provided with inserts in accordance with the invention that the inserts should be fitted with the grooves oriented in the correct direction, and not displaced by 180°. The inserts and the pressure plates are therefore preferably provided with co-operating location means so arranged as to allow the inserts to be oriented only in one direction.

When the aperture in the plate is a circular hole, as will usually be the case, the insert preferably comprises a cylinder provided with an eccentric peg adapted to engage with play in an eccentric hole in the plate, the play being sufficient to allow the insert to pivot by the slight amount required in use. The peg also prevents the insert from pivoting excessively and causing jamming of the ball.

If no means are provided for limiting the angular movement of the insert about its axis and the position of the groove relative to that axis is such that the centre of a ball travelling along the groove can at one point coincide with the axis of the insert there is a risk of the insert rotating under vibration into a position in which the orientation of the groove is such that the ball cannot travel in a circumferential direction.

If that occured during brake application the brake could not be released, and if it occurred when the brake is off it would not be possible to apply the brake.

To overcome that difficulty we may locate the groove in such a position in the insert that at no time in its travel can the centre of the ball coincide with the axis of the insert. In a convenient arrangement this is achieved by offsetting the position of the groove relative to the axis of the insert so that as the ball travels along the groove its centre moves along a pitch circle which has the axis of the pressure plate as its centre and is spaced radially from a concentric pitch circle containing the axis of the insert.

Figure 2:
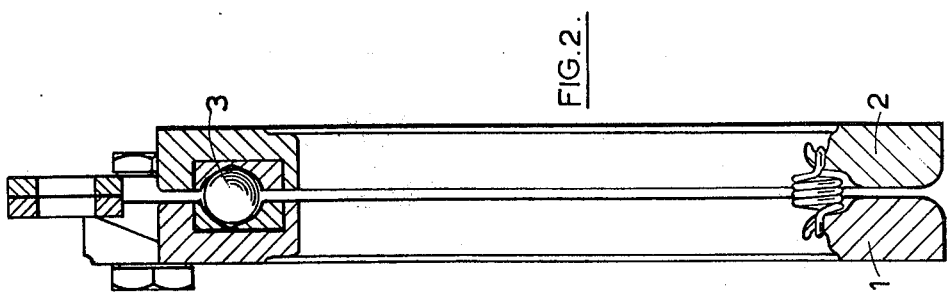
Figure 3:
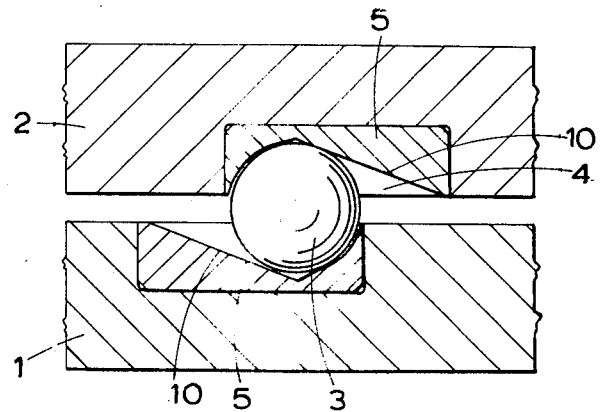
Figure 4:
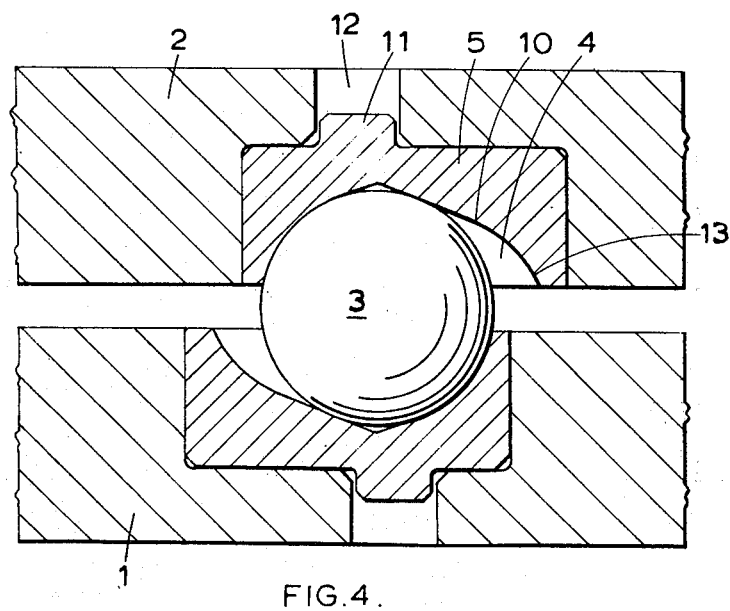
Figure 8:
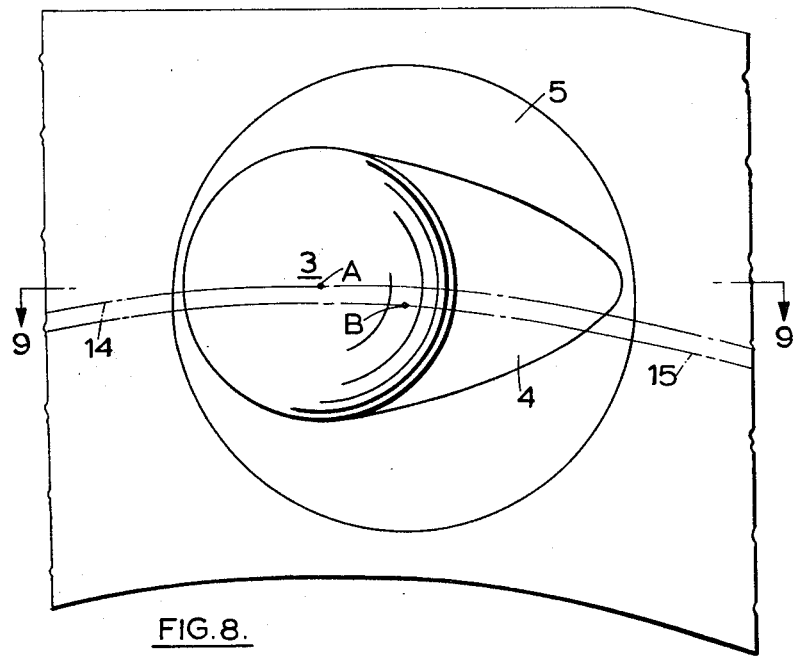
Figure 9:
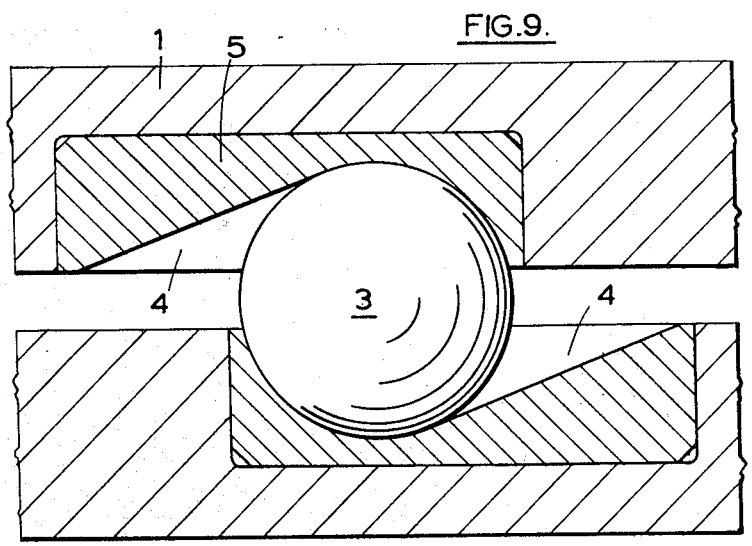

Our invention is described in more detail below with reference to the accompanying drawings in which:

FIG. 1 is an end elevation of a pair of pressure plates for a brake of the spreading disc kind with which the invention is concerned, FIG. 2 is a section on the line 2—2 of FIG. 1, FIG. 3 is a fragmentary section on the line 3—3 of FIG. 1, FIG. 4 is a section similar to FIG. 3 but showing rotatable inserts with means for orientating them and limiting their angular movement, FIG. 5 is a view taken normal to the face of a pressure plate shown in FIG. 4, the deeper part of the groove being shown at the top, FIG. 6 is a section on the line 6—6 of FIG. 5, FIG. 7 is a fragmentary section of two pressure plates incorporating grooved inserts and showing co-incidence of the centre of the ball in one position with the axes of the inserts, FIG. 8 is a diagrammatic face view of an insert and a co-operating ball in which the centre of the ball and the axis of the insert are located on radially spaced concentric pitch circles, and FIG. 9 is a section on the line 9—9 of FIG. 8.

In FIGS. 1 to 3, 1 and 2 are co-operating annular pressure plates of a spreading disc brake. Axial separation of the plates urges rotatable friction discs (not shown) on opposite sides of the plates into engagement with stationary surfaces normal to the axis of the brake.

Axial separation of the plates is effected on relative angular movement between the plates by angularly spaced balls 3 rolling in complementary straight grooves 4 in inserts 5 mounted in recesses in the adjacent faces of the plates.

The application of the brake is initiated by a pull applied to a pull-rod (not shown) attached to the junction of toggle links 6, 7 pivotally connected to radial lugs 8, 9 on the respective pressure plates, the links moving the plates angularly in opposite directions.

The inserts 5 are circular and are rotatably mounted in complementary recesses in the pressure plates.

The grooves 4 are of the form shown in FIG. 3, varying progressively in depth from one end, where the depth is slightly less than half the diameter of a ball, to the other end where the incline 10 runs out into the surface of the insert. FIG. 3 shows the ball in the deeper end of the recesses which position corresponds to the minimum separation of the pressure plates in the off position of the brake. It will be noted that in this position of the ball its centre is offset to one side of the centre of the offset so that the incline 10 is of a length considerably greater than half the diameter of the insert.

A groove of the form shown may conveniently be machined by advancing a rotary cutter of the same radius as a ball normally into the face of an insert up to the required maximum depth of the groove and then progressively withdrawing the cutter as it is traversed relative to the insert in a straight line.

It is desirable that the groove in each insert should be correctly oriented when the brake is assembled so that the ball will travel in a substantially circumferential path relative to the axis of the pressure plates and also that angular movement of the insert in its recess should be limited to prevent it from rotating into a position in which the groove is out of alignment with the correct path of the ball and the ball will jam.

For that purpose each insert may be provided on its rear face with an eccentric peg 11 which is received in a hole 12 in the pressure plate offset from the axis of the insert as shown in FIG. 4. There is sufficient play between the peg and the hole to provide for the necessary small angular movement of the insert to allow the ball to move in a circumferential path as it travels along the groove.

FIG. 4 also shows a steep end portion 13 to the shallower end of the groove to form a stop limiting the maximum travel of the ball in the groove.

The insert shown in FIG. 4 is shown in face view and in transverse section in FIGS. 5 and 6.

If no means are provided for orienting an insert and limiting its angular movement a ball may come into an intermediate position in its travel along the grooves in co-operating inserts in which, as shown in FIG. 7, the centre of the ball coincides with the axis of one or each insert. The ball then exerts no restraining influence on angular movement of an insert, and there is a possiblity that an insert may rotate under vibration out of its correct angular position.

To prevent this we may locate the groove in the insert in such a position that the centre of the ball is at all times throughout its travel offset radially from the axis of the insert.

In the form shown in FIGS. 8 and 9 the centre A of the ball lies on a pitch circle 14 while the axis B of the insert lies on a concentric pitch circle 15 offset radially from the pitch circle 14 and the centre of the ball can at no time coincide with that of the axes of the inserts.

The term "straight" as applied to the grooves in the inserts in the above description refers to the centre line of a groove viewed in a direction at right angles to the face of the insert.

In a section of an insert at right angles to its face, as for example in FIG. 5, the inclined surface of the groove on which the ball rolls may be other than straight if it is desired to vary the extent of "lift" of the ball as it travels along the groove.

The grooved inserts described above were devised particularly for oil-immersed brakes of large diameter but it will be appreciated that the invention is not limited to such brakes. It may be used in spreading disc brakes of various dimensions, both oil-immersed and dry, where the advantages of reduced machining costs and smaller inserts make it worthwhile.

In dry brakes means may be incorporated to reduce frictional resistance to rotational movement of an insert in a pressure plate. For this purpose a layer of bearing material or a coating of plastic or other material having a low co-efficient of friction may be interposed between the insert and the plate.

We claim:

1. An insert for a pressure plate in a brake of the spreading disc kind which includes pressure plates having opposed cooperating camming surfaces thereon and balls co-operating with said surfaces to spread said plates upon relative rotation therebetween, said inserts comprising a circular member adapted to be rotatably mounted in a recess in a pressure plate and incorporating on one face a straight groove having a longitudinal axis and of progressively varying depth along said axis for co-operation with a ball located in the groove and in a complementary groove in an insert in a co-operating pressure plate, the circular member also incorporating on a face opposite said one face a rearwardly projecting peg adapted to be received in an opening in the pressure plate offset from the axis of the circular member.

2. A disc brake of the spreading disc kind including pressure plates having opposed cooperating camming surfaces thereon and camming elements cooperating with said surfaces to spread said plates upon relative rotation therebetween, said camming elements comprising balls and said camming surfaces comprising straight grooves having longitudinal axes and of progressively varying depths along said axes, said grooves receiving said balls and being formed in inserts received in complementary recesses in said pressure plates, said inserts being angularly movable in said recesses about the axes of said inserts normal to the planes of the plates to enable said balls to move along said straight grooves in a path which is substantially circumferential with respect to the axes of said plates, and means for restricting the angular movement of the inserts about their said normal axes to an amount not in excess of predetermined limits.

3. A disc brake as in claim 2 wherein the position of the groove in each insert is such in relation to the axis about which the insert is rotatable that in the application of the brake the centre of the ball cannot at any time coincide with the said axis so that the insert is not liable to rotate out of its correct angular position under vibration.

4. A disc brake as in claim 3 wherein, in the assembled brake, the centres of the balls and the axes of the inserts are located on radially separated concentric pitch circles.

5. A disc brake as in claim 2 wherein each insert and its recess are circular, and the means for restricting angular movement of each insert comprises an eccentric peg carried on the rear face of the insert and engaging with play in a complementary hole in the pressure plate for orienting the insert and for permitting limited angular movement of the insert from the oriented position.

6. A pressure plate for a disc brake of the spreading disc kind which includes pressure plates having opposed cooperating camming surfaces thereon and balls cooperating with said camming surfaces to spread said plates upon relative rotation therebetween, said pressure plate comprising a plate, a plurality of inserts received in complementary recesses in said plate and being angularly movable in said recesses about axes normal to the plane of the plate, said camming surfaces on said plate comprising straight grooves having longitudinal axes formed in said inserts, said grooves being of progressively varying depth along said axes and being adapted to receive said balls, and means for restricting the angular movement of the inserts about their said normal axes to an amount not in excess of predetermined limits.

7. A pressure plate for a disc brake as in claim 6 wherein the deeper end of the groove in an insert in which a ball rests in the off position is offset from the axis of the insert to provide an inclined portion of the groove of a length in a circumferential direction greater than half the diameter of the insert.

8. A pressure plate as in claim 6 wherein the insert is circular and is rotatably mounted in its complementary recess in the plate and the position of the groove relative to the axis of the insert is such that in the application of the brake the centre of the ball cannot at any time coincide with that axis.

9. A pressure plate as in claim 8 wherein the centre of a ball in all positions of its travel along the groove in the insert lies on a pitch circle spaced radially from a pitch circle on which the axis of the insert lies.

10. A pressure plate as in claim 6 wherein each insert is oriented with its groove substantially circumferential with respect to the axis of the plate, and the means for restricting angular movement of an insert is arranged to limit said movement from the oriented position of said insert.

11. A pressure plate as in claim 10 wherein each insert is circular and said movement restricting means comprises an eccentric peg on the back of the insert engaging with play in a hole in the plate.

* * * * *